United States Patent
Zhang et al.

(10) Patent No.: US 11,112,554 B2
(45) Date of Patent: Sep. 7, 2021

(54) BACK LIGHT UNIT, FABRICATING METHOD THEREOF AND DISPLAY DEVICE

(71) Applicants: BEIJING BOE OPTOELECTRONICS TECHNOLOGY CO., LTD., Beijing (CN); BOE TECHNOLOGY GROUP CO., LTD., Beijing (CN)

(72) Inventors: Shubai Zhang, Beijing (CN); Haiwei Sun, Beijing (CN); Ming Zhai, Beijing (CN); Yutao Hao, Beijing (CN); Pengfei Cheng, Beijing (CN)

(73) Assignees: BEIJING BOE OPTOELECTRONICS TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/641,123

(22) PCT Filed: Aug. 13, 2019

(86) PCT No.: PCT/CN2019/100374
§ 371 (c)(1),
(2) Date: Feb. 21, 2020

(87) PCT Pub. No.: WO2020/057295
PCT Pub. Date: Mar. 26, 2020

(65) Prior Publication Data
US 2021/0149105 A1    May 20, 2021

(30) Foreign Application Priority Data
Sep. 21, 2018   (CN) .......................... 201811109607.8

(51) Int. Cl.
*G02F 1/1335* (2006.01)
*F21V 8/00* (2006.01)
*G02F 1/1362* (2006.01)

(52) U.S. Cl.
CPC .......... *G02B 6/0053* (2013.01); *G02B 6/0043* (2013.01); *G02B 6/0055* (2013.01); *G02F 1/133553* (2013.01); *G02F 1/1362* (2013.01)

(58) Field of Classification Search
CPC .. G02B 6/0043; G02B 6/0053; G02B 6/0055; G02F 1/133553; G02F 1/1362
See application file for complete search history.

(56) References Cited

U.S. PATENT DOCUMENTS

| | | | |
|---|---|---|---|
| 2001/0050736 A1* | 12/2001 | Lee ..................... | G02B 6/0053 349/65 |
| 2007/0139776 A1* | 6/2007 | Meng ................... | G02B 5/045 359/529 |

(Continued)

FOREIGN PATENT DOCUMENTS

| | | |
|---|---|---|
| CN | 101326459 A | 12/2008 |
| CN | 101398569 A | 4/2009 |

(Continued)

*Primary Examiner* — Zheng Song
(74) *Attorney, Agent, or Firm* — Myers Bigel, P.A.

(57) ABSTRACT

The present disclosure relates to the field of display technology, and provides a back light unit, a fabricating method thereof, and a display device in embodiments. The back light unit includes a composite layer. The composite layer includes a light guide layer and a first substrate opposite to each other, and a plurality of first microprisms and a plurality of second microprisms between the light guide layer and the first substrate. Specifically, the light guide layer includes a light exit surface facing the first substrate, and the plurality of first microprisms are on the light exit surface of the light guide layer. The plurality of second microprisms are on a surface of the first substrate facing the light guide (Continued)

layer. Moreover, the first microprisms are fixedly connected to the second microprisms.

16 Claims, 5 Drawing Sheets

(56) References Cited

U.S. PATENT DOCUMENTS

| | | | |
|---|---|---|---|
| 2008/0043172 A1* | 2/2008 | Kim | G02B 6/0053 349/65 |
| 2008/0259248 A1* | 10/2008 | Shimazaki | G02B 6/0053 349/65 |
| 2009/0079905 A1* | 3/2009 | Kimura | G02B 6/0053 349/62 |
| 2009/0103008 A1 | 4/2009 | Nasu et al. | |
| 2011/0110104 A1* | 5/2011 | Kim | G02B 6/0053 362/341 |
| 2014/0355250 A1* | 12/2014 | Tyan | G02B 5/0226 362/97.1 |
| 2015/0160383 A1* | 6/2015 | Zhu | G02B 6/0088 359/625 |
| 2015/0301264 A1* | 10/2015 | Min | G02B 6/0036 362/343 |
| 2015/0301265 A1* | 10/2015 | Min | G02B 5/045 362/327 |
| 2018/0252968 A1* | 9/2018 | Nakamura | G02B 6/0053 |
| 2018/0364412 A1* | 12/2018 | Yao | G02B 6/0053 |

FOREIGN PATENT DOCUMENTS

| | | |
|---|---|---|
| CN | 208818991 U | 5/2019 |
| JP | H10268304 A | 10/1998 |
| JP | 2007256493 A | 10/2007 |

\* cited by examiner

BACK LIGHT UNIT, FABRICATING METHOD THEREOF AND DISPLAY DEVICE

RELATED APPLICATION

The present application is a 35 U.S.C. 371 national stage application of PCT International Application No. PCT/CN2019/100374, filed on Aug. 13, 2019, which claims the benefit of Chinese Patent Application No. 201811109607.8, filed on Sep. 21, 2018, the entire disclosures of which are incorporated herein by reference.

TECHNICAL FIELD

The present disclosure relates to the display technology, in particular to a back light unit, a fabricating method thereof and a display device.

BACKGROUND

Thin film transistor liquid crystal display (TFT-LCD) belongs to a type of flat panel display device, and it is becoming more and more popular in the field of high-performance display because of its small size, low power consumption, no radiation, and relatively low production cost.

A TFT-LCD usually includes a back light unit (BLU) for providing a backlight to a display panel. Typically, the back light unit includes a plurality of stacked optical films. Therefore, in the state of use, testing, or transportation of the display device, some optical films may undergo relative displacement, which may cause wrinkles, and cause undesirable phenomena such as Newton rings and moire patterns in the displayed image.

SUMMARY

According to an aspect of the present disclosure, a back light unit is provided. The back light unit comprises a composite layer. The composite layer comprises: a light guide layer and a first substrate opposite to each other, wherein the light guide layer comprises a light exit surface facing the first substrate; a plurality of first microprisms on the light exit surface of the light guide layer, wherein each first microprism of the plurality of first microprisms extends in a first direction parallel to the light exit surface of the light guide layer and the plurality of first microprisms are sequentially arranged in a second direction parallel to the light exit surface of the light guide layer, the second direction and the first direction crossing each other; and a plurality of second microprisms on a surface of the first substrate facing the light guide layer, wherein each second microprism of the plurality of second microprisms extends parallel to the second direction, and the plurality of second microprisms are sequentially arranged in the first direction. Further, in the above composite layer, the first microprisms are fixedly connected to the second microprisms.

According to a specific implementation, in a back light unit provided by an embodiment of the present disclosure, the composite layer further comprises a second substrate between the plurality of first microprisms and the plurality of second microprisms; wherein a surface of the second substrate facing the first substrate is connected to the plurality of second microprisms, and a surface of the second substrate facing the light guide layer is connected to the plurality of first microprisms.

According to a specific implementation, in a back light unit provided by an embodiment of the present disclosure, the composite layer further comprises: a third substrate and a fourth substrate stacked and connected to each other between the plurality of first microprisms and the plurality of second microprisms. Further, a surface of the third substrate facing the first substrate is connected to the plurality of second microprisms, and a surface of the fourth substrate facing the light guide layer is connected to the plurality of first microprisms.

According to a specific implementation, in a back light unit provided by an embodiment of the present disclosure, the plurality of first microprisms are in direct contact with the plurality of second microprisms and form an integrated structure.

According to a specific implementation, in a back light unit provided by an embodiment of the present disclosure, the composite layer further comprises: one or more grooves at positions where the plurality of first microprisms and the plurality of second microprisms are in contact with each other. Specifically, each groove is in one first microprism and configured to receive a portion of a corresponding second microprism. Alternatively, each groove is in one second microprism and configured to receive a portion of a corresponding first microprism.

According to a specific implementation, in a back light unit provided by an embodiment of the present disclosure, at least one of the plurality of first microprisms comprises a first triangular prism, the first triangular prism comprises a first side surface, a second side surface, and a third side surface, wherein the first side surface of the first triangular prism is in contact with the light guide layer, and an included angle between the second side surface and the third side surface is 60°-120°. Further, at least one of the plurality of second microprisms comprises a second triangular prism, and the second triangular prism comprises a first side surface, a second side surface, and a third side surface, wherein the first side surface of the second triangular prism is in contact with the first substrate, and an included angle between the second side surface of the second triangular prism and the third side surface of the second triangular prism is 60°-120°.

According to a specific implementation, in a back light unit provided by an embodiment of the present disclosure, the second side surface and the third side surface of the first triangular prism are connected by an arc surface. Alternatively, the second side surface and the third side surface of the second triangular prism are connected by an arc surface.

According to a specific implementation, in a back light unit provided by an embodiment of the present disclosure, the composite layer further comprises a plurality of dot structure on a surface of the light guide layer away from the first substrate.

According to a specific implementation, in a back light unit provided by an embodiment of the present disclosure, in a direction perpendicular to the light exit surface of the light guide layer, the thickness of the composite layer is 250 μm-600 μm.

According to a specific implementation, a back light unit provided by the embodiment of the present disclosure further comprises a first reflective layer on a side of the light guide layer away from the first substrate.

According to another aspect of the present disclosure, a display device is also provided. The display device comprises: a display panel; and the back light unit according to any one of the preceding embodiments.

According to a specific implementation, in a display device provided by an embodiment of the present disclosure, the display panel comprises an array substrate and a counter substrate assembled opposite to each other; and the back light unit is on a side of the array substrate away from the counter substrate, wherein the first substrate faces the array substrate and the light guide layer is away from the array substrate.

According to a specific implementation, in a display device provided by an embodiment of the present disclosure, the display panel comprises an array substrate and a counter substrate opposite to each other, and a second reflective layer on a side of the array substrate away from the counter substrate. Specifically, the back light unit is on a side of the counter substrate away from the array substrate, wherein the first substrate faces the counter substrate, and the light guide layer is away from the array substrate.

According to a specific implementation, in a display device provided by an embodiment of the present disclosure, the plurality of first microprisms are in direct contact with the plurality of second microprisms; at least one first microprism of the plurality of first microprisms comprises at least one groove configured to receive a portion of at least one second microprism of the plurality of second microprisms in direct contact with the at least one first microprism; and the display device comprises a plurality of sub-pixels in a display area and arranged in an array in the first direction and the second direction, wherein a number of sub-pixels in the first direction is greater than a number of sub-pixels in the second direction.

According to a specific implementation, in a display device provided by an embodiment of the present disclosure, the plurality of first microprisms are in direct contact with the plurality of second microprisms; at least one second microprism of the plurality of second microprisms comprises at least one groove configured to receive a portion of at least one first microprism of the plurality of first microprisms in direct contact with the at least one second microprism; and the display device comprises a plurality of sub-pixels in a display area and arranged in an array in the first direction and the second direction, wherein a number of sub-pixels in the first direction is smaller than a number of sub-pixels in the second direction.

According to a specific implementation, in a display device provided by an embodiment of the present disclosure, a viewing angle of the display device is between 0° and ±30°; and in a direction perpendicular to the light exit surface of the light guide layer, a ratio S of a depth of the groove to a height of the first microprism or the second microprism where the groove is located satisfies $0<S\leq 1/5$.

According to a specific implementation, in a display device provided in an embodiment of the present disclosure, a viewing angle of the display device is between 0° and ±60°; and in a direction perpendicular to the light exit surface of the light guide layer, a ratio S of a depth of the groove to a height of the first microprism or the second microprism where the groove is located satisfies $0<S\leq 3/5$.

According to another aspect of the present disclosure, a fabricating method for the above back light unit is also provided. The fabricating method comprises steps of: forming the plurality of first microprisms on a light exit surface of the light guide layer through a patterning process; forming the plurality of second microprisms on a surface of the first substrate facing the light guide layer through a patterning process; and fixedly connecting the plurality of first microprisms to the plurality of second microprisms.

According to a specific implementation, in the method for fabricating a back light unit provided in an embodiment of the present disclosure, the step of fixedly connecting the plurality of first microprisms to the plurality of second microprisms comprises: bringing the first microprisms into direct contact with the second microprisms, and the plurality of first microprisms and the plurality of second microprisms are formed into an integrated structure by a curing process.

According to a specific implementation, in the method for fabricating a back light unit provided in an embodiment of the present disclosure, the step of fixedly connecting the plurality of first microprisms to the plurality of second microprisms comprises: forming a second substrate bonded to the plurality of first microprisms on a surface of the plurality of first microprisms away from the light guide layer; and bonding a surface of the second substrate away from the light guide layer to the plurality of second microprisms.

According to a specific implementation, in the method for fabricating a back light unit provided in an embodiment of the present disclosure, the step of fixedly connecting the plurality of first microprisms to the plurality of second microprisms comprises: forming a fourth substrate bonded to the plurality of first microprisms on a surface of the plurality of first microprisms away from the light guide layer; forming a third substrate bonded to the plurality of second microprisms on a surface of the plurality of second microprisms away from the first substrate; and bonding a surface of the fourth substrate away from the light guide layer and a surface of the third substrate away from the first substrate.

BRIEF DESCRIPTION OF THE DRAWINGS

In order to more clearly illustrate the technical solutions in embodiments of the disclosure, the appended drawings needed to be used in the description of the embodiments will be introduced briefly in the following. Obviously, the drawings in the following description are only some embodiments of the disclosure, and for those of ordinary skills in the art, other drawings may be obtained according to these drawings under the premise of not paying out creative work.

DETAILED DESCRIPTION OF THE DISCLOSURE

Figure 1:
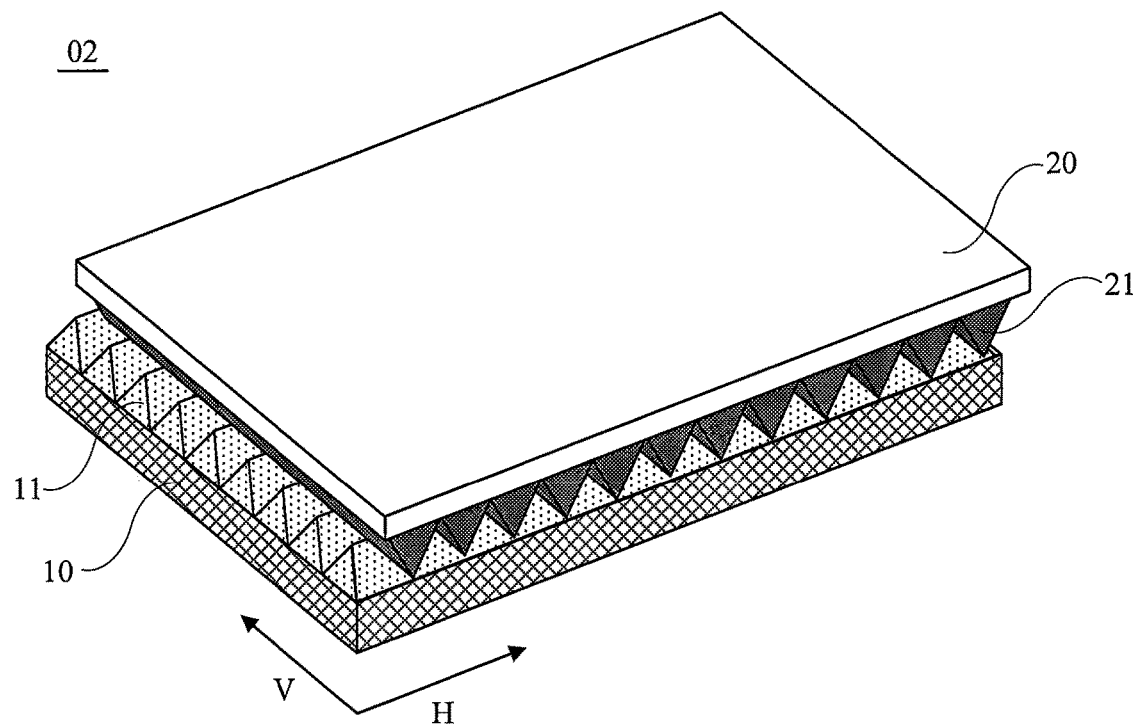
FIG. 1 is a schematic structural diagram of a composite layer according to some embodiments of the present disclosure.

The technical solutions in the embodiments of the present disclosure will be clearly and completely described below with reference to the accompanying drawings in the embodiments of the present disclosure. Obviously, the described embodiments only represent a part of the embodiments of the present disclosure, rather than all the embodiments. Based on the embodiments in the present disclosure, all other embodiments obtained by a person of ordinary skill in the art without creative efforts shall fall within the protection scope of the present invention.

In the following description, the terms "first", "second", and the like are used for descriptive purposes only and cannot be understood as indicating or implying relative importance or implicitly indicating the number of technical features indicated. Thus, features defined using "first", "second", etc. may explicitly or implicitly include one or more of the features. In the description of the embodiments of the present application, unless otherwise stated, "multiple" means two or more.

Further, in the following description, the following reference numerals are used to refer to different components according to embodiments of the present disclosure: 01—back light unit; 02—composite layer; 03—display panel; 10—light guide layer; 100—dot structure; 11—first microprism; 20—first substrate; 21—second microprism; 22—second substrate; 23—third substrate; 24—fourth substrate; 30—light source; 40—anti-adsorption layer; 41—first reflective layer; 42—second reflective layer; 50—scattering layer; 300—array substrate; 301—counter substrate; and 110—groove.

According to some embodiments of the present application, a back light unit is provided. The back light unit includes a composite layer 02 as shown in FIG. 1. The composite layer 02 includes a light guide layer 10 and a first substrate 20 opposite to each other.

In addition, as shown in FIG. 1, the above-mentioned composite layer 02 further includes a plurality of first microprisms 11 and a plurality of second microprisms 21 between the light guide layer 10 and the first substrate 20.

Specifically, the plurality of first microprisms 11 are on a surface of the light guide layer 10 facing the first substrate 20, that is, a light exit surface of the light guide layer 10, and each of the first microprisms 11 extends in a first direction H parallel to the light exit surface of the light guide layer 10.

Similarly, the plurality of second microprisms 21 are on a surface of the first substrate 20 facing the light guide layer 10, and each of the second microprisms 21 extends in a second direction V parallel to the light exit surface of the light guide layer 10, wherein the second direction V is different from the first direction H. Specifically, as shown in FIG. 1, the second direction V and the first direction H are perpendicular to each other.

Further, in some embodiments of the present disclosure, a patterning process may be used to form the plurality of first microprisms 11 on the light exit surface of the light guide layer 10. As an example, as shown in FIG. 1, the first microprism 11 may have a triangular prism shape, and one side surface of the first microprism 11 may be made in contact with and fixedly connected with the light exit surface of the light guide layer 10.

According to an example embodiment, a material (e.g., a transparent resin material) for forming the above-mentioned light guide layer 10 may be selected so that light incident on the light guide layer 10 from the light source 30 (shown in FIG. 2 below) can be totally reflected within the light guide layer 10. As an example, such a transparent resin material may be polycarbonate (PC). In addition, the hardness of the light guide layer 10 can be flexibly selected according to actual needs. For example, the light guide layer 10 may be a plate structure with a relatively hard material or a film structure with a relatively soft material.

Similarly, on a surface of the first substrate 20 facing the light guide layer 10, the plurality of second microprisms 21 can be formed by a patterning process. For example, one side surface of the formed second microprism 21 is brought into contact with and fixedly connected to the surface of the first substrate 20 facing the light guide layer 10.

According to an example embodiment, a material for forming the first substrate 20 described above may include a transparent resin material. For example, the transparent resin material may be selected as polyethylene terephthalate (PET).

It should be noted that, in the above description, the first direction H and the second direction V are both parallel to the light exit surface of the light guide layer 10. Here, the light exit surface of the light guide layer 10 refers to a surface at which light rays inside the light guide layer 10 exit from the light guide layer 10, for example, the upper surface of the light guide layer 10 shown in the figure.

For convenience of description, in the following embodiments, as an example, the first direction H may be a horizontal direction corresponding to the horizontal viewing angle of the display panel, and the second direction V may be a vertical direction corresponding to the vertical viewing angle of the display panel. For example, if the display panel is used in a handheld device such as a mobile phone, the horizontal viewing angle and vertical viewing angle of the display panel described above will be the horizontal viewing angle and the vertical viewing angle when the handheld device is in a vertical state (for example, when held by a standing user), that is, respectively correspond to the extending directions of the two pairs of sides of, for example, a rectangular display panel.

In addition, for the above patterning process, a process for forming a predetermined pattern, such as a photolithography process, an inkjet printing process, or a roll coating transfer process, may be specifically adopted. For example, the above-mentioned photolithography process refers to a process of forming a pattern by using a photoresist, a mask, an exposure machine, and the like, and typically includes processes such as film formation, exposure, and development. It should be noted that on the premise of benefiting from the teachings of the present disclosure, those skilled in the art can select a corresponding patterning process according to the specific structure formed in the embodiments of the present disclosure.

Figure 2:
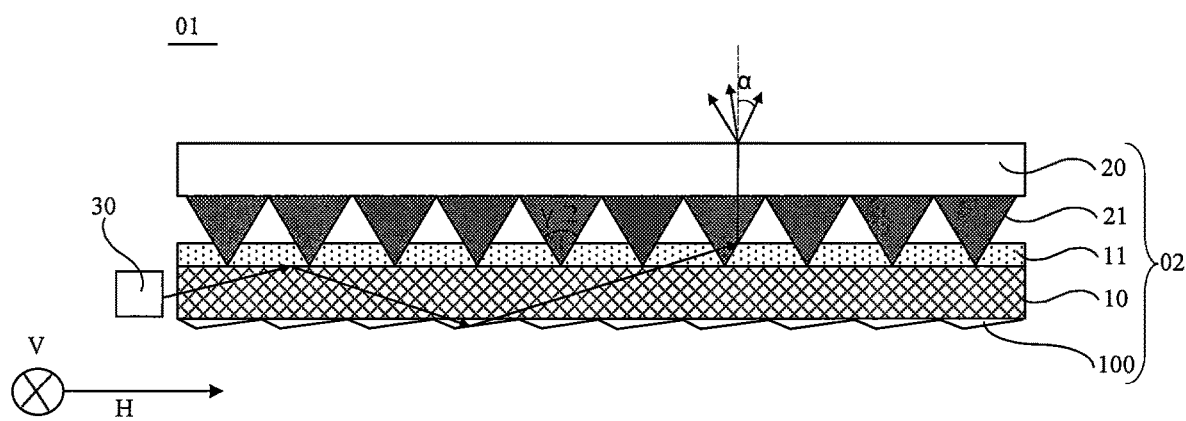
FIG. 2 is a schematic structural diagram of a back light unit according to some embodiments of the present disclosure.

According to an embodiment of the present disclosure, as shown in FIG. 2, the above-mentioned back light unit 01 may further include a light source 30. For example, the light source 30 is disposed on at least one side surface of the light guide layer 10. In the following description, a side surface of the light guide layer 10 on which the light source 30 is provided is referred to as a light incident surface of the light guide layer 10.

Typically, the light beam emitted by the light source 30 has a cone shape (for example, a cone angle is about 120°). In this case, among the light rays incident from the light source 30 to the inside of the light guide layer 10, a part of the light rays propagate in the first direction H, and another part of the light rays propagate in the second direction V. Referring to, for example, FIG. 2, the first direction H is perpendicular to the light incident surface of the light guide layer 10, and the second direction V is parallel to the light incident surface of the light guide layer 10.

In addition, as shown in FIG. 2, the above-mentioned composite layer 02 further includes a plurality of dot structures 100 on a non-light-exit surface of the light guide layer 10. The non-light-exit surface of the light guide layer 10 is the surface opposite to the light exit surface of the light guide layer 10, that is, the lower surface in the figure.

In this case, as shown in FIG. 2, the light transmitted in the first direction H inside the light guide layer 10 will be able to be transmitted forward by total reflection in the light guide layer 10. It should be understood that, due to the introduction of the dot structures 100, the total reflection of the light transmitted in the first direction H will be disturbed when incident on the dot structures 100, so that this part of the light exits from the light exit surface of the light guide layer 10. In contrast, if the total reflection of the light transmitted in the first direction H is not disturbed due to the incident on the dot structures 100, then this part of the light will continue to be transmitted through the total reflection in the light guide layer 10.

Based on this, the light transmitted in the first direction H in the light guide layer 10 is exit from the light exit surface of the light guide layer 10 under the action of the dot structures 100 described above. After that, this part of the light is incident on the second microprisms 21. According to an embodiment of the present disclosure, the second microprisms 21 can converge the incident light, so that the exit angle α of the light exit from the second microprisms 21 is controlled within a certain range, thereby improving the brightness of the light finally exit. That is, in the embodiment of the present disclosure, the plurality of second microprisms 21 above the light guide layer and each extending in the second direction V are capable of converging the part of the light transmitting in the light guide layer 10 in the first direction H and exit from the light guide layer 10 due to the destruction of the total reflection.

In some embodiments of the present disclosure, as shown in FIG. 1, at least one, in particular each of the above-mentioned second microprisms 21 is a triangular prism. For example, as shown in FIG. 1 or 2, the second microprism 21 having a triangular prism shape has, for example, three side surfaces of a rectangle, that is, a first side surface, a second side surface, and a third side surface that are adjacent to each other, and two bottom surfaces of a triangle. Specifically, the first side surface is in contact with the first substrate 20, and the other two side surfaces (i.e., the second side surface and the third side surface) form an included angle with each other, for example, the included angle γ2 in FIG. 2. The inventors have found that when the above-mentioned included angle γ2 of the second microprism 21 having a triangular prism shape is smaller than 60° or greater than 120°, the exit angle α of the part of the light exit from the second microprism 21 is too large. As a result, the final horizontal viewing angle of the display device (which corresponds to, for example, the light transmitted in the first direction H) is too large, so that the light exit at the edge of the display device cannot be received by human eyes and eventually causes waste of this part of light. In view of this, in embodiments of the present disclosure, advantageously, the included angle γ2 of the second microprism 21 having a triangular prism shape can be selected in a range of 60°-120° to avoid unnecessary waste of light.

Based on the above, in some embodiments of the present disclosure, for a display panel having a smaller size in the first direction H (e.g., a horizontal size) than a size in the second direction V (e.g., a vertical size), or a display device (such as a mobile phone) including such a display panel, the horizontal viewing angle is required to be relatively small. In this case, advantageously, the included angle γ2 of the second microprism 21 may be selected to be 90°. In this case, the exit angle α of the light exit from the second microprism 21 can be controlled at about ±30°, so that the horizontal viewing angle has higher brightness.

Alternatively, in other embodiments of the present disclosure, for a display panel having a larger size (e.g., a horizontal size) in the first direction H relative to a size (e.g., a vertical size) in the second direction V, or a display device (e.g., a flat-panel TV) including such a display panel, the horizontal viewing angle is required to be relatively large. In this case, advantageously, the included angle γ2 of the second microprism 21 can be selected to be 60° or 120°. In this way, it can both ensure that the light exit at the edges of the display panel or the display device can be received by human eyes, and increase the horizontal viewing angle of the display panel or the display device, thereby improving the display effect.

Considering the symmetry of the light beam emitted from the light source 30, the light transmitted in the second direction V in the light guide layer 10 will be transmitted forward by total reflection in a similar manner. Once again, due to the introduction of the dot structure 100, the total reflection of the portion of the light transmitted in the light guide layer 10 in the second direction V but incident on the dot structure 100 will be disturbed, so that this portion of the light will similarly exit from the light guide layer 10.

Figure 3:
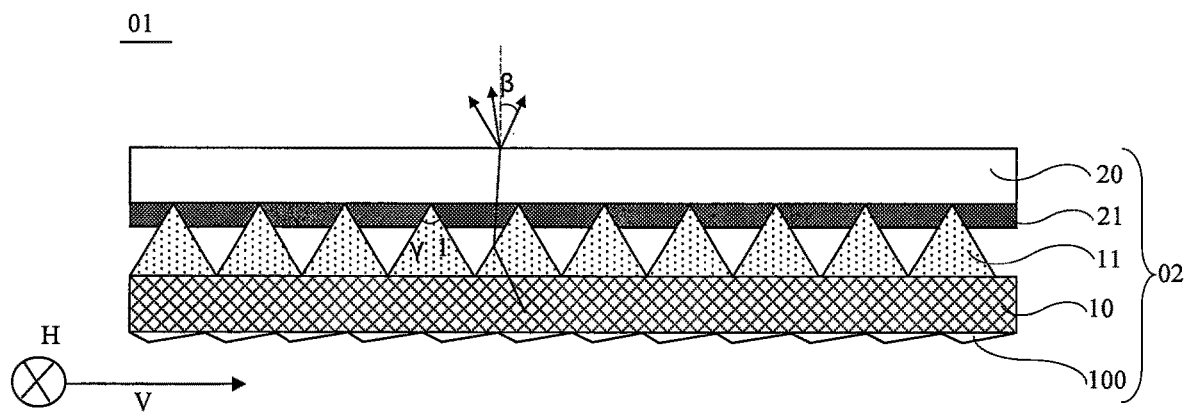
FIG. 3 is a schematic structural diagram of another back light unit according to some embodiments of the present disclosure.

In such a case, for example, as shown in FIG. 3, after the total reflection is disturbed, the light originally transmitted in the light guide layer 10 in the second direction V will exit from the light exit surface of the light guide layer 10 and then incident on the first microprisms 11 above the light guide layer 10. Similar to the second microprisms 21 described above, in the embodiment of the present disclosure, the first microprisms 11 can also converge the light incident thereon, so that the exit angle β of the light finally exiting from the first microprisms 11 is controlled within a certain range, thereby increasing the brightness of the exit light. That is, according to the embodiment of the present disclosure, the plurality of first microprisms 11 play a similar role to the plurality of second microprisms 21, that is, to converge the part of light originally transmitted in the second direction V in the light guide layer 10 but exited from the light guide layer 10 due to the destruction of the total reflection.

In some embodiments of the present disclosure, as shown in FIG. 1, the first microprism 11 may also be designed as a triangular prism. Similar to the case of the second microprism 21 shown in FIG. 2, as shown in FIG. 3, the first microprism 11 also has three side surfaces, one of which is in contact with the light guide layer 10, and the other two form an included angle γ1. The inventors have found again that if the included angle γ1 of the first microprism 11 is selected to be smaller than 60° or greater than 120°, the exit angle β of the light exit from the first microprism 11 is too large. In such a case, the vertical viewing angle (which corresponds to the light transmitted in the second direction V) of the display panel or the display device including the display panel is too large, so that the light exit at the edge of the display panel or the display device cannot be received by human eyes, and this part of the light is wasted. In view of this, in embodiments of the present disclosure, the above-mentioned included angle γ1 of the first microprism 11 is selected to be 60°-120° advantageously.

Based on this, in some embodiments of the present disclosure, for a display panel or display device (e.g., a flat panel TV) having a smaller size (e.g., a vertical size) in the second direction V than a size (e.g., a horizontal size) in the first direction H, the vertical viewing angle is required to be relatively small. In this case, the included angle γ1 of the first microprism 11 may be selected to be 90°. The exit angle β of the light exit from the first microprism 11 can be controlled at about ±30°, so that the light in the vertical viewing angle has higher brightness.

Alternatively, in other embodiments of the present disclosure, for a display panel or display device (e.g., a mobile phone) having a larger size (e.g., a vertical size) in the second direction V than a size (e.g., a horizontal size) in the first direction H, the vertical viewing angle is required to be relatively large. In this case, the included angle γ1 of the first microprism 11 may be selected to be 60° or 120°. In such a case, it can both ensure that the light exit at the edges of the display panel or the display device can be received by human eyes, and increase the vertical viewing angle of the display panel or the display device, thereby improving the display effect.

As can be seen from the above, in the embodiments of the present disclosure, by selecting an appropriate range or value of the included angle γ1 for the first microprism 11 and the included angle γ2 for the second microprism 21, it is possible to make the exit light of the display panel or display device has greater brightness in one viewing angle (such as a horizontal or vertical viewing angle), while obtaining a larger viewing angle range in another viewing angle (such as a vertical or horizontal viewing angle).

Figure 4:
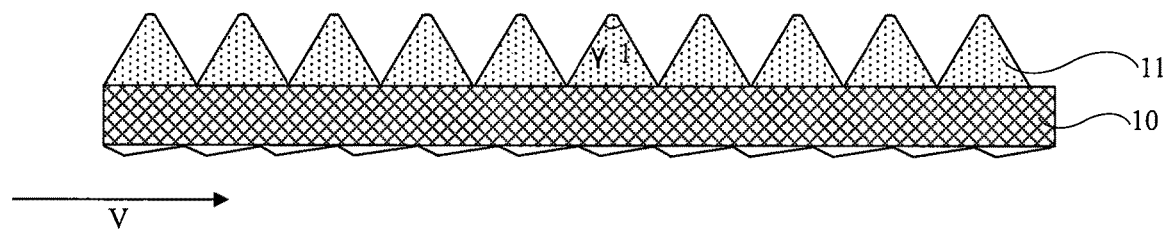
FIG. 4 is another schematic structural diagram of the first microprisms of the back light unit in FIG. 3.

In addition, according to a further optional embodiment of the present disclosure, if the included angle γ1 of the first microprism 11 is kept constant, the other two side surfaces (e.g. the second and third side surfaces) in the first microprism 11 that are not in contact with the light guide layer 10 may be connected through an arc surface, instead of having a common edge for two side surfaces adjacent to each other in a regular triangular prism, as shown in FIGS. 1-3. That is, in a cross section parallel to the bottom surface of the first microprism 11, a vertex angle away from the light guide layer 10 is a rounded angle, as shown in FIG. 4, in order to further increase the viewing angle range of the vertical viewing angle of the display device.

Similarly, according to another optional embodiment of the present disclosure, if the included angle γ2 of the second microprism 21 is kept constant, the other two side surfaces (e.g. the second and third side surfaces) in the second microprism 21 that are not in contact with the first substrate 20 may also be connected through a circular arc surface, instead of having a common edge for two side surfaces adjacent to each other in a regular triangular prism, as shown in FIGS. 1-3. That is, in a cross section parallel to the bottom surface of the second microprism 21, a vertex angle away from the light guide layer 10 is a rounded angle, in order to further increase the viewing angle range of the horizontal viewing angle of the display device.

Further, according to an embodiment of the present disclosure, in the back light unit 01, the above-mentioned first microprism 11 and the second microprism 21 are fixedly connected to each other. According to an embodiment of the present disclosure, optionally, in the back light unit 01, one side surface of the plurality of first microprisms 11 is in contact with and fixedly connected with the light exit surface of the light guide layer 10, and similarly, one side surface of the plurality of second microprisms 21 is in contact with and fixedly connected to a surface of the first substrate 20 facing the light guide layer 10. This means that throughout the composite layer 02, the various components are fixedly connected to each other, that is, the relative positions of the various components within the composite layer 02 keep fixed. In this way, for a display panel or display device including the back light unit 01, it is unlikely that relative movement between the various components will occur in the composite layer 02 during the process of use, testing, or transportation, which effectively reduce the probability of occurrence of wrinkles in the composite layer 02 and the occurrence of undesirable phenomena such as Newton's rings and moire pattern in the displayed image.

In addition, according to the above embodiments, it can also be concluded that in the composite layer 02 of the back light unit 01, the light emitted by the light source 30 will be able to exit from the light exit surface of the light guide layer 10, and further, incident on the first microprism 11 and the second microprism 21. After that, the first microprism 11 and the second microprism 21 can respectively converge the portions of the incident light that were originally transmitted in the second direction V and the first direction H in the light guide layer 10, thereby improving the brightness of the displayed picture in the corresponding vertical and horizontal viewing angles.

Based on this, according to embodiments of the present disclosure, in the back light unit 01 having the composite layer 02 described above, there is no need to further provide structures such as an upper light guide plate, upper and lower prisms, and a diffusion sheet. In addition, in the composite layer 02, the light guide layer 10 may also be made of a soft resin material. In such a case, the light guide layer 10 may be a light guide film. Particularly, in an embodiment of the present disclosure, the thickness of the light guide layer 10 may be 200 μm. In this case, the thickness of the composite layer 02 will be in a range of 250 μm to 600 μm. Those skilled in the art should understand that when the thickness of the composite layer 02 is less than 250 μM, the precision requirement for the fabricating process is high, which is not conducive to reducing the production cost. On the contrary, if the thickness of the composite layer 02 is too large, for example, it is larger than 600 μm, the thickness of the finally formed back light unit 01 will be too large, which is not conducive to the ultra-thin design of the display device.

Next, the fixed connection manner between the first microprism 11 and the second microprism 21 in embodiments of the present disclosure will be described in detail with reference to specific implementations.

Figure 5:
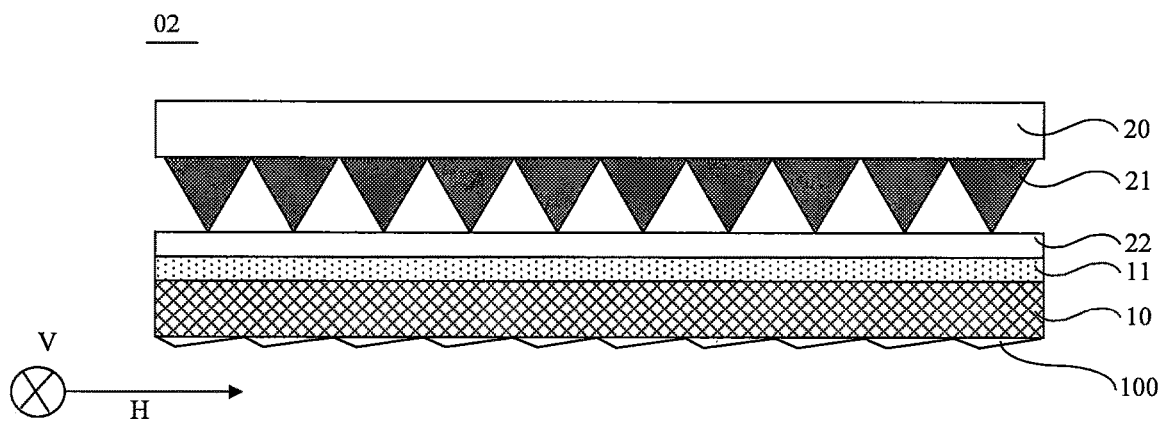
FIG. 5 is a schematic structural diagram of yet another back light unit according to some embodiments of the present disclosure.

For example, in some embodiments of the present disclosure, as shown in FIG. 5, the composite layer 02 further includes a second substrate 22.

Specifically, the second substrate 22 is between the plurality of first microprisms 11 and the plurality of second microprisms 21.

Further, a surface of the second substrate 22 facing the first substrate 20 (i.e., the upper surface in the figure) is connected to the plurality of second microprisms 21, and a surface of the second substrate 22 facing the light guide layer 10 (i.e., the lower surface in the figure) is connected to the plurality of first microprisms 11.

As an example, in some embodiments of the present disclosure, the above-mentioned second substrate 22 may be a single adhesive layer, so that the top end of the first microprism 11 (i.e., the end facing the first substrate 20 in the figure) and the top end of the second microprism 21 (i.e., the end facing the light guide layer 10 in the figure) are bonded together.

Alternatively, in other embodiments of the present disclosure, the above-mentioned second substrate 22 may be a transparent resin film layer.

In this case, in the fabricating process of the back light unit 01, for example, a light guide layer 10 having a plurality of first microprisms 11 and a first substrate 20 having a plurality of second microprisms 21 may be fabricated first. After that, an adhesive layer may be coated on the surface (i.e., the lower surface) of the second substrate 22 facing the light guide layer 10, and such an adhesive layer may be bonded to the top end of the first microprism 11. Next, in the same manner, an adhesive layer may be coated on the surface (i.e., the upper surface) of the second substrate 22 away from the light guide layer 10, and then the top ends of the plurality of second microprisms 21 are bonded to the adhesive layer of the second substrate 22. In this way, the upper and lower surfaces of the second substrate 22 can provide a larger bonding area for the second microprisms and the first microprisms 11 respectively, thereby reducing the difficulty of the above bonding process.

Figure 6:
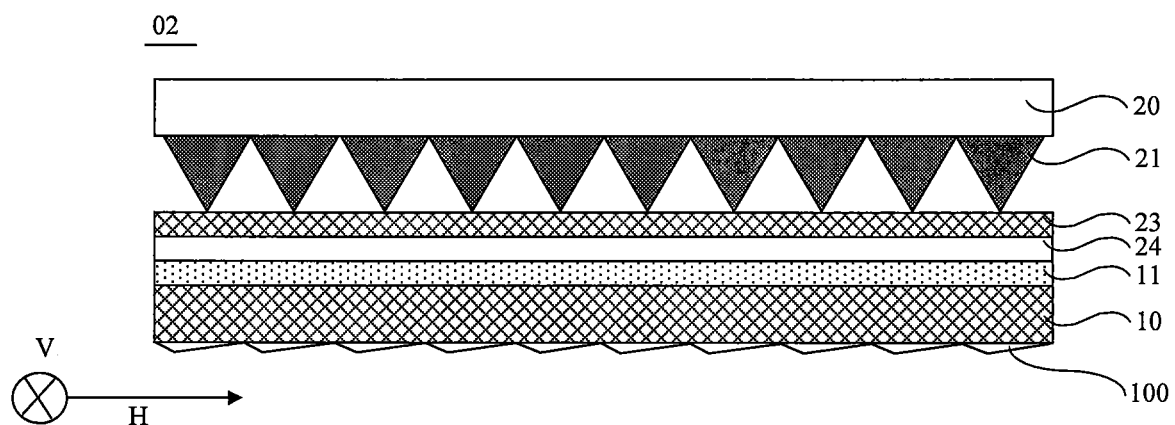
FIG. 6 is a schematic structural diagram of still another back light unit according to some embodiments of the present disclosure.

Alternatively, in some embodiments of the present disclosure, the fixed connection manner between the first microprism 11 and the second microprism 21 may also be as shown in FIG. 6. For example, referring to FIG. 6, the above-mentioned composite layer 02 further includes a third substrate 23 and a fourth substrate 24 which are stacked and connected to each other, and further, the third substrate 23 and the fourth substrate 24 are also between the plurality of microprisms 11 and the plurality of second microprisms 21.

In addition, as shown in FIG. 6, in the back light unit 01, a surface of the third substrate 23 facing the first substrate 20 (i.e., an upper surface) is connected to the plurality of second microprisms 21, and a surface of the fourth substrate 24 facing the light guide layer 10 (i.e., an lower surface) is connected to the plurality of first microprisms 11.

In some embodiments of the present disclosure, the third substrate 23 and the second substrate 24 described above may both be transparent resin film layers. Based on this, in the fabricating process, a light guide layer 10 having a plurality of first microprisms 11 and a first substrate 20 having a plurality of second microprisms 21 may be fabricated first. Then, an adhesive layer is coated on the surface (lower surface) of the fourth substrate 24 facing the light guide layer 10, and is bonded to the top end of the first microprism 11. Next, in a similar manner, an adhesive layer is coated on the surface (upper surface) of the third substrate 23 away from the light guide layer 10, and then the top ends of the plurality of second microprisms 21 are bonded to the third substrate 23. In this way, the upper surface of the third substrate 23 and the lower surface of the fourth substrate 24 can provide larger bonding areas for the second microprisms 21 and the first microprisms 11 respectively, thereby reducing the difficulty of the above-mentioned bonding process.

Alternatively, in some embodiments of the present application, the fixed connection manner between the first microprism 11 and the second microprism 21 may also be as shown in FIG. 2 or FIG. 3. For example, referring to FIG. 2 or FIG. 3, the plurality of first microprisms 11 are in direct contact with the plurality of second microprisms 21 and become an integrated structure.

Specifically, in the fabricating process, firstly, the microprisms 11 may be formed on the light guide layer 10 and the second microprisms 21 may be formed on the first substrate 20 through a semi-curing process. Next, the first microprisms 11 and the second microprisms 21 that are in contact with each other are fixedly connected together through a full curing process.

With the benefit of the teachings of the present disclosure, those skilled in the art should understand that the above-mentioned curing process may be a thermal curing or a light curing process, and the present disclosure is not limited in this regard.

Figure 7:
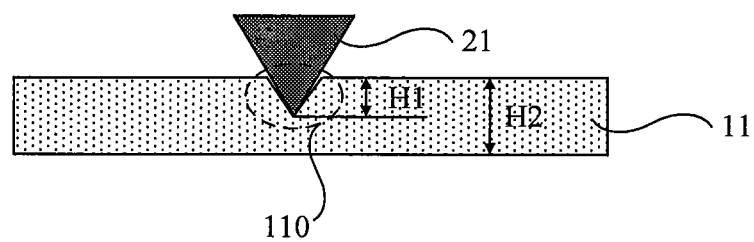
FIG. 7 is a schematic structural diagram of a first microprism and a second microprism in contact with each other of the back light unit in FIG. 2.

Based on the above, in the process of bringing the semi-cured first microprism 11 and the second microprism 21 into direct contact, if the hardness of the first microprism 11 and the second microprism 21 are different, as shown in FIG. 7, a soft microprism (e.g., the first microprism 11) will form a groove 110, and a hard microprism (e.g., the second microprism 21) will be located in the groove 110 and in contact with the inner wall of the groove 110.

In addition, according to the foregoing description, it can be learned that the second microprism 21 is capable of converging the light that originally transmitted in the light guide layer 10 in the first direction H (e.g., the horizontal direction) but exited from the light guide layer 10 due to the destruction of the total reflection. Moreover, for a display device with a smaller vertical size than a horizontal size (e.g., a flat panel TV), it is easier to improve the brightness of the entire display screen by converging the light in the horizontal direction than the vertical size. In such a case, in particular, if the first direction H and the second direction V are horizontal direction and vertical or longitudinal direction respectively (i.e., perpendicular to each other), for a flat panel TV with sub-pixels arranged in an array, the number of sub-pixels in the horizontal direction is obviously greater than the number of sub-pixels in the vertical or longitudinal direction. That is, for a display device with a relatively large horizontal size, such as a flat panel TV, the number of sub-pixels in the horizontal direction is significantly larger, so the convergence of light in the horizontal direction is more important.

In this case, in the entire back light unit 01, the above-mentioned groove 110 is provided at a position where the first microprism 11 and the second microprism 21 are in contact with each other. For example, if the hardness of the first microprism 11 is small (i.e., soft), then a part of the second microprism 21 is located in the groove 110, that is, the groove 110 is in the first microprism 11. In this way, as shown in FIG. 2, the top end corresponding to the included angle γ2 in the second microprism 21 will be able to retain the complete shape. Thus, the convergence effect of the second microprism 21 on the light in the horizontal direction is effectively ensured.

Similarly, according to the above embodiment, it can also be learned that the first microprism 11 is capable of converging the light that originally transmitted in the light guide layer 10 in the second direction V (e.g., the vertical direction) but exited from the light guide layer 10 due to the destruction of the total reflection. Moreover, for a display device (e.g., a mobile phone) having a smaller horizontal size than a vertical size, it is easier to improve the brightness of the entire display screen by converging light in the vertical direction than in the horizontal direction. In such a case, in particular, if the first direction H and the second direction V are horizontal direction and vertical or longitudinal direction respectively (i.e., perpendicular to each other), for a mobile phone having sub-pixels arranged in an array, the number of sub-pixels in the horizontal direction is obviously smaller than the number of sub-pixels in the vertical or longitudinal direction. That is, for a display device with a relatively large vertical size, such as a mobile phone, the number of sub-pixels in the vertical or longitudinal direction is significantly larger, so the convergence of light in the vertical or longitudinal direction is more important.

In this case, in the entire back light unit 01, the above-mentioned groove 110 is provided at a position where the second microprism 21 and the first microprism 11 are in contact with each other. For example, if the hardness of the second microprism 21 is small (i.e., soft), then a part of the first microprism 11 will be located in the groove 110, that is, the groove 110 is in the second microprism. In this way, as shown in FIG. 3, the top end of the first microprism 11 corresponding to the included angle γ1 can retain the complete shape. Therefore, the convergence effect of the first microprism 11 on the light in the longitudinal direction is effectively ensured.

In addition, the inventors have also found that in the above-mentioned back light unit 01, the larger the contact area between the first microprism 11 and the second microprism 21, the better the light scattering effect is, and the greater the viewing angle the display device will have. For example, when the top ends of the first microprism 11 and the second microprism 21 facing each other are in direct contact, the display device has a viewing angle of 0°. However, as shown in FIG. 7, if a groove 110 is provided on a microprism (e.g., the first microprism 11), and the depth H1 (i.e., the depth in the direction perpendicular to the light exit surface of the light guide layer 10) of the groove 110 is increased, then the portion of the second microprism 21 in the groove 110 will increase, thereby obtaining a larger contact area between the first microprism 11 and the second microprism 21, thereby achieving an increase in the viewing angle of the display device.

In this case, in some further optional embodiments, for a display device that requires a higher center brightness, for example, a mobile phone with a smaller horizontal size than a vertical size, the required viewing angle is small, typically between 0° and ±30°. In this case, a ratio S of the depth H1 of the groove 110 to the height H2 of the microprism having the groove 110 (e.g., the first microprism 11 shown in FIG. 7) S=H1:H2 can be selected as 0<S ≤ ⅕.

When the depth H1 of the groove 110 occupies ⅕ of the height H2 of the microprism (e.g., the first microprism 11) provided with the groove 110, the contact depth between the first microprism 11 and the second microprism 21 will be ⅕ of the height H2 of the first microprism 11. In this case, the inventors have found that the viewing angle of the mobile phone can reach ±30°.

When the contact depth between the first microprism 11 and the second microprism 21 is further reduced so that the height H1 of the groove 110 is smaller than ⅕ of the height H2 of the first microprism 11, the viewing angle of the mobile phone can even reach ±10°.

Here, it should be noted that, in all the above descriptions, the depth of the groove 110 and the height of the corresponding microprism are in the direction perpendicular to the light exit surface of the light guide layer 10, as shown in FIG. 7, for example.

In other embodiments of the present disclosure, for a display device that requires a lower center brightness, for example, a flat panel TV with a smaller vertical size than a horizontal size, the required viewing angle is large, such as between 0° and ±60°. In such a case, a ratio S of the depth H1 of the groove 110 to the height H2 of the microprism having the groove 110 (e.g., the first microprism 11) S=H1:H2 can be selected as 0<S ≤ ⅗.

When the depth H1 of the groove 110 occupies ⅗ of the height H2 of the microprism (e.g., the above-mentioned first microprism 11) provided with the groove 110, the contact depth between the first microprism 11 and the second microprism 21 will be ⅗ of the height H2 of the first microprism 11. In this case, the inventors have found that the viewing angle of the flat panel TV can reach ±60°.

When the contact depth between the first microprism 11 and the second microprism 21 is further reduced so that the height H1 of the groove 110 is less than ⅗ of the height H2 of the first microprism 11, the viewing angle of the flat panel TV can even reach ±10°.

Figure 8:
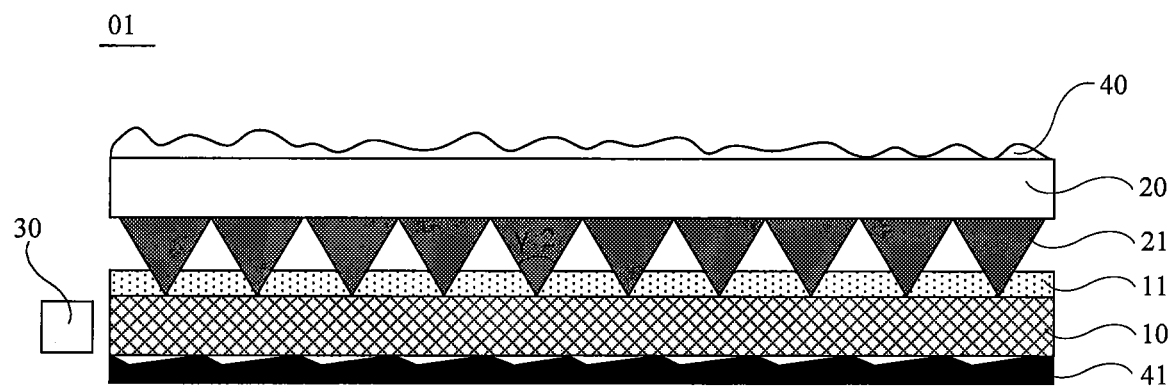
FIG. 8 is a schematic structural diagram of still another back light unit according to some embodiments of the present disclosure.

In addition, in some embodiments of the present disclosure, the back light unit may further include other thin film layers that are in contact with the light exit surface of the composite layer 02. For example, such a thin film layer may be a polarizer. In this case, since the polarizer is attached on the light exit surface of the composite layer 02, wrinkles are likely to be generated in the polarizer. In order to reduce or even eliminate such wrinkles, as shown in FIG. 8, in an embodiment of the present disclosure, the above-mentioned composite layer 02 may further include an anti-attachment layer 40 disposed on a surface of the first substrate 20 away from the light guide layer 10. Further, the anti-attachment layer 40 has a plurality of grooves and a plurality of protrusions, so as to improve the roughness of the light exit surface of the composite layer 02. In this way, air can be accommodated in the grooves of the anti-attachment layer 40, so that the attachment force between the light exit surface of the composite layer 02 and the above-mentioned polarizer or other thin film layers can be reduced.

In addition, in some embodiments of the present disclosure, as shown in FIG. 8, the back light unit 01 further includes a first reflective layer 41 so as to improve the utilization rate of light, for example. Specifically, the first reflective layer 41 is on a side of the light guide layer 10 away from the first substrate 20. By using the first reflective layer 41, the light originally exited from the lower surface (i.e., the non-light-exit surface) of the light guide layer 10 can be reflected into the light guide layer 10 again, thereby realizing the reuse of this part of the light and reduction and reducing the optical loss of the entire device.

Figure 9:
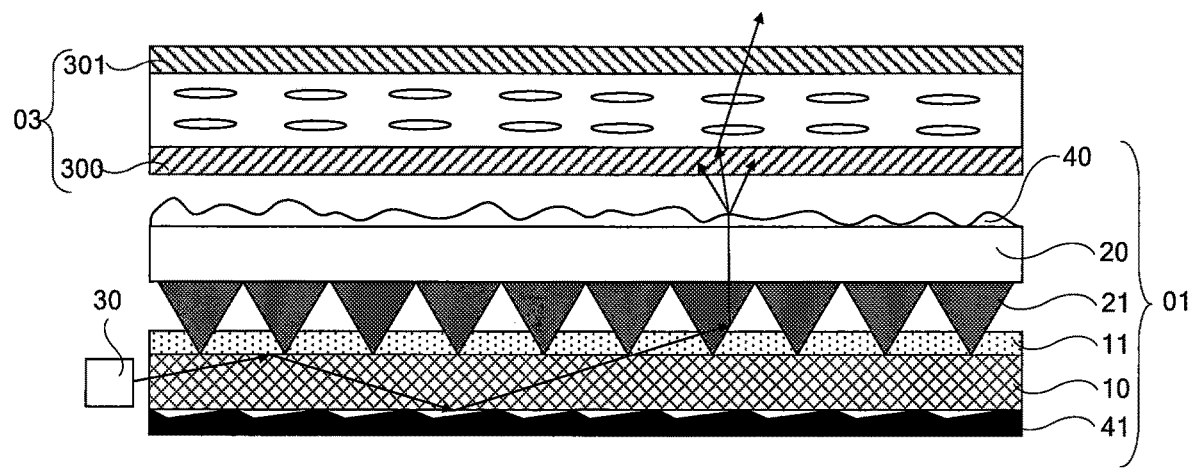
FIG. 9 is a schematic structural diagram of a display device according to some embodiments of the present disclosure.
Figure 10:
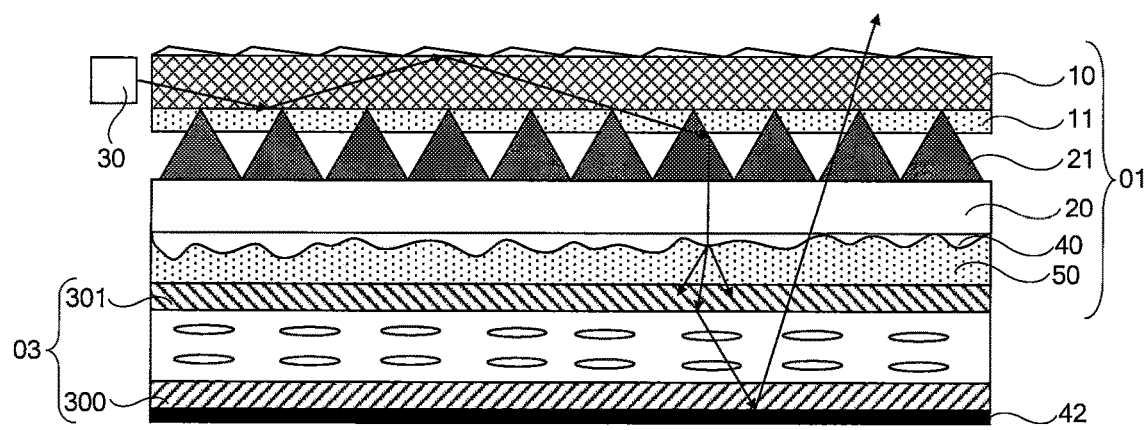
FIG. 10 is a schematic structural diagram of another display device according to some embodiments of the present disclosure.

According to another aspect of the present disclosure, a display device is also provided in embodiments. Specifically, the display device includes a display panel 03 as shown in FIG. 9 or FIG. 10, and any one of the back light units 01 described above. This display device has the same technical effects as the back light units 01 provided in the above embodiments, and will not be repeated here.

It should be noted that, the display device may be a liquid crystal display device. As an example, the liquid crystal display device includes a device having a display function, such as a mobile phone, a television, and a tablet computer.

In addition, according to the setting position of the back light unit 01 in the display device, the above display device can be further divided into a rear-backlight display device and a front-backlight display device. The structures of these two display devices will be described in detail below with reference to the drawings.

As shown in FIG. 9, the display device is a rear-backlight display device. Specifically, in the display device, the display panel 03 includes an array substrate 300 and a counter substrate 301 opposite to each other, and a liquid crystal layer is further provided between the array substrate 300 and the counter substrate 301. As an example, when the counter substrate 301 includes a color filter substrate, the counter substrate 301 may be a color filter substrate.

In addition, in the above-mentioned rear-backlight display device, the back light unit 01 is on a side of the array substrate 300 away from the counter substrate 301. Specifically, in the back light unit 01, the first substrate 20 faces the array substrate 300, and the light guide layer 10 is away from the array substrate 300.

As can be seen from FIG. 9, in the display device, the light incident from the light source 30 into the light guide layer 10 will exit from the light exit surface of the light guide layer 10, and then incident on the array substrate 300 in the display panel 03 under the light converging effect of the first microprism 11 and the second microprism 21, and exits after passing through the liquid crystal layer and the counter substrate 301, thereby displaying an image.

Figure 11:
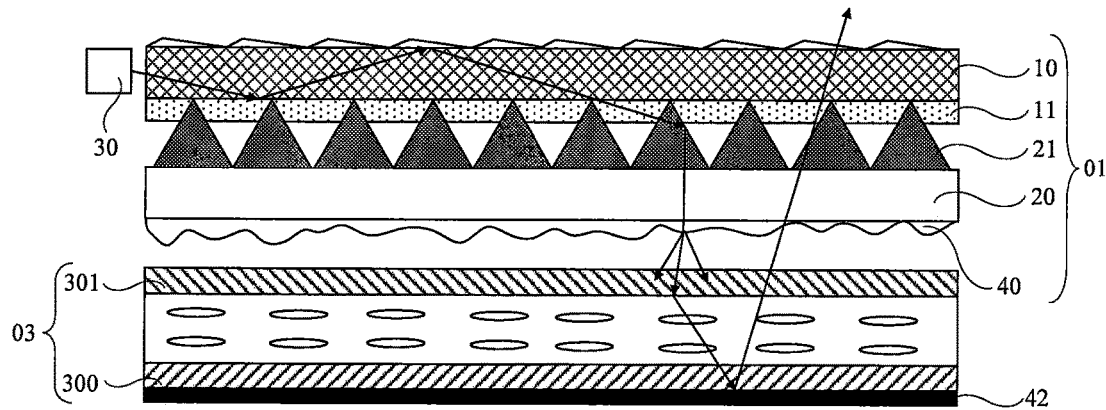
FIG. 11 is a schematic structural diagram of yet another display device according to some embodiments of the present disclosure.

In other embodiments of the present disclosure, a front-backlight display device may also be provided. As shown in FIG. 10 or FIG. 11, in the front-backlight display device, the display panel 03 includes an array substrate 300 and a counter substrate 301 opposite to each other, and a second reflective layer 42 on a side of the array substrate 300 away from the counter substrate 301.

According to a specific implementation, in the above front-backlight display device, the back light unit 01 is on a side of the counter substrate 301 away from the array substrate 300 and does not include a first reflective layer 41 (as shown in FIG. 9). In addition, in the back light unit 01, the first substrate 20 faces the counter substrate 301, and the light guide layer 10 is away from the array substrate 300.

As shown in FIG. 10, in the front-backlight display device, the light incident from the light source 30 into the light guide layer 10 will exit from the light exit surface of the light guide layer 10, and then incident on the counter substrate 301 in the display panel 03 under the light converging effect of the first microprism 11 and the second microprism 21, and then is incident on the second reflective layer 42 after passing through the liquid crystal layer and the array substrate 300. Next, under the reflection of the second reflective layer 42, the light passes through the display panel 03 and the back light unit 01 again and finally displays.

In order to enable the display panel 03 to receive light emitted from the back light unit 01 uniformly, as shown in FIG. 10, the back light unit 01 may further include a scattering layer 50 on a side of the first substrate 20 away from the light guide layer 10. Specifically, the scattering layer 50 can scatter the light incident on the display panel 03.

Alternatively, as shown in FIG. 11, the above-mentioned scattering layer 50 may be removed while increasing the roughness of the anti-attachment layer 40 on the surface of the first substrate 20 away from the light guide layer 10. In this way, scattering of light incident on the display panel 03 can be achieved by the anti-attachment layer 40.

It can be learned from the above that, in a rear-backlight display device, providing the structure that scatters the light incident on the display panel 03 will weak the light converging effect of the first microprism 11 and the second microprism 21. In view of this, a rear-backlight display device can generally be applied to a weak light environment. For example, the rear-backlight display devices may be some display devices using liquid crystal, for example, a watch having a display function and the like. Typically, these display devices have low requirements for the display quality, as long as they can display relevant information (such as time or date) under weak ambient light.

In addition, it can also be learned from the above that the second microprism 21 can converge light that is originally transmitted in the light guide layer 10 in the first direction H (e.g., horizontal direction) but exited from the light guide layer 10 due to the destruction of total reflection. Therefore, in order to ensure the convergence effect of the second microprism 21 on the light in the horizontal direction, the above-mentioned groove 110 may be provided at a position where the first microprism 11 and the second microprism 21 contact each other, and make a portion of the second microprism 21 in the groove 110. In this way, it is ensured that the top end of the second microprism 21 facing the first microprism 11 can retain a complete shape.

Based on this, for a display device with a smaller vertical size than a horizontal size (e.g., a flat panel TV), it is easier to improve the brightness of the entire display screen by converging the light in the horizontal direction than in the vertical direction. Therefore, the design for retaining the complete top shape of the second microprism 21 described above will be more suitable for a display device with a smaller vertical size than a horizontal size. That is, in the display area of the display device, the number of sub-pixels arranged in the first direction H is greater than the number of sub-pixels arranged in the second direction V.

Alternatively, it can also be learned from the above that the first microprism 11 can converge light that is originally transmitted in the light guide layer 10 in the second direction V (e.g., the longitudinal direction) but exited from the light guide layer 10 due to the damage of total reflection. Therefore, in order to ensure the convergence effect of the first microprism 11 on the light in the longitudinal direction, the above-mentioned groove 110 may be provided at a position where the second microprism 21 and the first microprism 11 contact each other, and make a portion of the first microprism 11 in the groove 110. In this way, it is ensured that the top end of the first microprism 11 facing the second microprism 21 can retain a complete shape.

Based on this, for a display device (e.g., a mobile phone) with a smaller horizontal size than a vertical size, it is easier to improve the brightness of the entire display screen by converging light in the vertical direction than the horizontal direction. Therefore, the design for retaining the complete top shape of the first microprism 11 described above will be more suitable for a display device with a smaller horizontal size than a vertical size. That is, in the display area of the display device, the number of sub-pixels arranged in the first direction H is smaller than the number of sub-pixels arranged in the second direction V.

Figure 12:
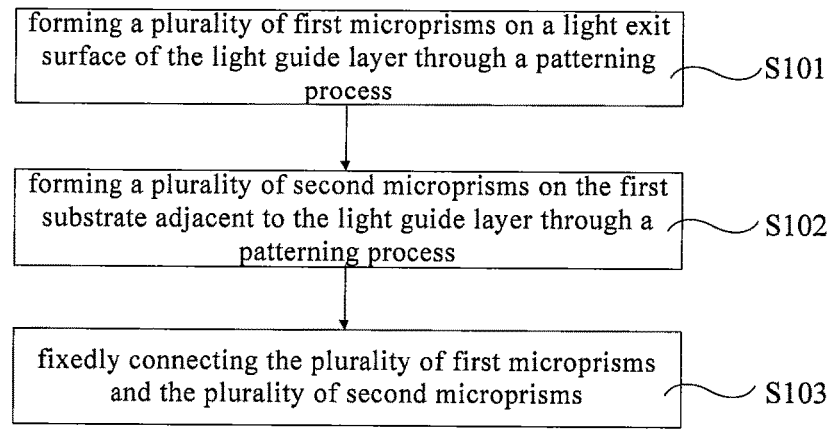
FIG. 12 is a flowchart of a method for fabricating a back light unit according to some embodiments of the present disclosure.

According to some embodiments of the present application, a method for fabricating a back light unit is also provided. As shown in FIG. 12, the fabricating method includes steps S101-S103.

In step S101, the plurality of first microprisms 11 are formed on a light exit surface of the light guide layer 10 through a patterning process.

Figure 13:
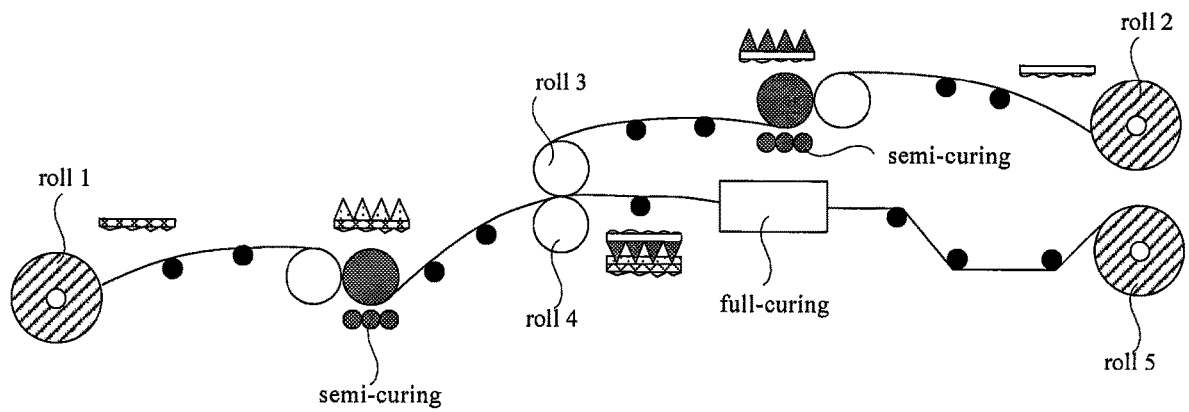
FIG. 13 is a schematic diagram of a corresponding process of a method for fabricating a back light unit according to some embodiments of the present disclosure.

For example, as shown in FIG. 13, the light guide film on which the dot structure 100 has been fabricated is wound on the reel 1. After the light guide film is cut, the light guide layer 10 is formed.

It should be noted that, in other embodiments of the present disclosure, the above-mentioned dot structure 100 may be fabricated after the first microprism 11 and the second microprism 21 are fabricated.

After the light guide film is developed, a plurality of first microprisms 11 are transferred to a surface of the light guide film on which the dot structure 100 is not provided by a roll coating process, and then the plurality of first microprisms 11 are semi-cured.

In step S102, the plurality of second microprisms 21 are formed on the first substrate 20 through a patterning process.

For example, as shown in FIG. 13, the reel 2 is wound with a resin film on which the anti-attachment layer 40 has been fabricated. After the resin film is cut, the first substrate 20 is formed.

It should be noted that, in other embodiments of the present disclosure, the anti-attachment layer 40 may be fabricated after the first microprism 11 and the second microprism 21 are fabricated.

After the resin film is developed, a plurality of second microprisms 21 are transferred to a surface of the resin film not provided with the anti-attachment layer 40 by a roll coating process, and then the plurality of second microprisms 21 are semi-cured.

In step S103, the plurality of first microprisms 11 and the plurality of second microprisms 21 are fixedly connected.

For example, as shown in FIG. 13, the light guide film on which the first microprisms 11 are made and the resin film on which the second microprisms 21 are made are oppositely arranged through the reels 3 and 4, and then the first microprisms 11 and the second microprisms 21 are in direct contact with each other and undergo a full curing process, so that the plurality of first microprisms 11 and the plurality of second microprisms 21 become an integrated structure.

Next, protective films are affixed on a surface of the light guide film away from the first microprisms 11 and a surface of the resin film away from the second microprisms 21, and are rolled by the reel 5 to facilitate cutting during the subsequent fabrication and assembly of the back light unit 01.

Alternatively, the above step S103 may include the following sub-steps: first, forming a second substrate 22 bonded to the first microprism 11 on a surface of the plurality of first microprisms 11 away from the light guide layer 10; and then, bonding a surface of the second substrate 22 away from the light guide layer 10 to the plurality of second microprisms 21.

In this way, the upper and lower surfaces of the second substrate 22 can provide larger bonding areas for the second microprisms 21 and the first microprisms 11 respectively, thereby reducing the difficulty of the above bonding process.

Further optionally, the above step S103 may include the following sub-steps: first, forming a fourth substrate 24 bonded to the plurality of first microprisms 11 on a surface of the plurality of first microprisms 11 away from the light guide layer 10; forming a third substrate 23 bonded to the plurality of second microprisms 21 on a surface of the plurality of second microprisms 21 away from the first substrate 20; and then, bonding a surface of the fourth substrate 24 away from the light guide layer 10 to a surface of the third substrate 23 away from the first substrate 20.

In this way, the upper surface of the third substrate 23 and the lower surface of the fourth substrate 24 can provide larger bonding areas for the second microprisms 21 and the first microprisms 11 respectively, thereby reducing the difficulty of the above bonding process.

The above fabricating method has the same technical effect as the back light units provided in the foregoing embodiments, and will not be repeated here.

The above descriptions are only specific implementations of the present disclosure, but the scope of protection of the present disclosure is not limited thereto. Various modifications and variations that can be easily conceived by those skilled in the art in the technical scope disclosed in this disclosure shall be covered within the protection scope of this disclosure. Therefore, the patent protection scope of the present disclosure should be defined by the claims.

The invention claimed is:

1. A back light unit comprising a composite layer, wherein the composite layer comprises:
   a light guide layer and a first substrate opposite to each other, wherein the light guide layer comprises a light exit surface facing the first substrate;
   a plurality of first microprisms on the light exit surface of the light guide layer, wherein each first microprism of the plurality of first microprisms extends in a first direction parallel to the light exit surface of the light guide layer, wherein the plurality of first microprisms are sequentially arranged in a second direction parallel to the light exit surface of the light guide layer, and wherein the second direction and the first direction cross each other; and
   a plurality of second microprisms on a surface of the first substrate facing the light guide layer, wherein each second microprism of the plurality of second microprisms extends parallel to the second direction, and wherein the plurality of second microprisms are sequentially arranged in the first direction,
   wherein the first microprisms are connected to the second microprisms, and
   wherein the composite layer further comprises:
   one or more grooves at positions where the plurality of first microprisms and the plurality of second microprisms are in contact with each other,
   wherein each groove is in one first microprism of the plurality of first microprisms and configured to receive a portion of a corresponding second microprism of the plurality of second microprisms, or each groove is in one second microprism of the plurality of second microprisms and configured to receive a portion of a corresponding first microprism.

2. A display device comprising:
   a display panel; and
   the back light unit according to claim 1.

3. The display device according to claim 2,
   wherein the plurality of first microprisms are in direct contact with the plurality of second microprisms; and
   one of the following:
   at least one first microprism of the plurality of first microprisms comprises at least one groove configured to receive a portion of at least one second microprism of the plurality of second microprisms in direct contact with the at least one first microprism, wherein the display device comprises a plurality of sub-pixels in a display area and arranged in an array in the first direction and the second direction, wherein a number of sub-pixels in the first direction is greater than a number of sub-pixels in the second direction; or
   at least one second microprism of the plurality of second microprisms comprises at least one groove configured to receive a portion of at least one first microprism of the plurality of first microprisms in direct contact with the at least one second microprism, wherein the display device comprises a plurality of sub-pixels in a display area and arranged in an array in the first direction and the second direction, and wherein a number of sub-pixels in the first direction is smaller than a number of sub-pixels in the second direction.

4. The display device according to claim 3, wherein
a viewing angle of the display device is between 0° and ±30°; and
in a direction perpendicular to the light exit surface of the light guide layer, a ratio S of a depth of the groove to a height of the first microprism or the second microprism in the groove satisfies $0<S\leq 1/5$.

5. The display device according to claim 3, wherein
a viewing angle of the display device is between 0° and ±60°; and
in a direction perpendicular to the light exit surface of the light guide layer, a ratio S of a depth of the groove to a height of the first microprism or the second microprism in the groove satisfies $0<S\leq 3/5$.

6. The display device according to claim 2,
wherein the display panel comprises an array substrate and a counter substrate opposite to each other,
wherein the back light unit is on a side of the array substrate away from the counter substrate, and
wherein the first substrate faces the array substrate and the light guide layer is away from the array substrate.

7. The display device according to claim 2,
wherein the display panel comprises an array substrate and a counter substrate opposite to each other, and a second reflective layer on a side of the array substrate away from the counter substrate,
wherein the back light unit is on a side of the counter substrate away from the array substrate, and
wherein the first substrate faces the counter substrate, and the light guide layer is away from the array substrate.

8. The back light unit according to claim 1,
wherein at least one of the plurality of first microprisms comprises a first triangular prism, wherein the first triangular prism comprises a first side surface, a second side surface, and a third side surface,
wherein the first side surface of the first triangular prism is in contact with the light guide layer,
wherein an included angle between the second side surface and the third side surface is 60°-120°,
wherein at least one of the plurality of second microprisms comprises a second triangular prism,
wherein the second triangular prism comprises a first side surface, a second side surface, and a third side surface adjacent to each other,
wherein the first side surface of the second triangular prism is in contact with the first substrate, and
wherein an included angle between the second side surface of the second triangular prism and the third side surface of the second triangular prism is 60°-120°.

9. The back light unit according to claim 8,
wherein the second side surface and the third side surface of the first triangular prism are connected by an arc surface, and/or the second side surface and the third side surface of the second triangular prism are connected by an arc surface.

10. A method for fabricating the back light unit according to claim 1, comprising:
forming the plurality of first microprisms on the light exit surface of a light guide layer through a patterning process;
forming the plurality of second microprisms on a surface of the first substrate facing the light guide layer through a patterning process; and
connecting the plurality of first microprisms to the plurality of second microprisms by forming one or more grooves at positions where the plurality of first microprisms and the plurality of second microprisms are in contact with each other, wherein each groove is in one first microprism of the plurality of first microprisms and configured to receive a portion of a corresponding second microprism of the plurality of second microprisms, or each groove is in one second microprism of the plurality of second microprisms and configured to receive a portion of a corresponding first microprism.

11. The method for fabricating the back light unit according to claim 10, wherein the connecting the plurality of first microprisms to the plurality of second microprisms comprises:
bringing the first microprisms into direct contact with the second microprisms, and
forming the plurality of first microprisms and the plurality of second microprisms into an integrated structure by a curing process.

12. The back light unit according to claim 1, wherein the plurality of first microprisms are in direct contact with the plurality of second microprisms and form an integrated structure.

13. The back light unit according to claim 1, wherein the composite layer further comprises:
a plurality of dot structures on a surface of the light guide layer away from the first substrate.

14. The back light unit according to claim 1,
wherein in a direction perpendicular to the light exit surface of the light guide layer, a thickness of the composite layer is 250 μm-600 μm.

15. The back light unit according to claim 1, further comprising:
a first reflective layer on a side of the light guide layer away from the first substrate.

16. A back light unit comprising a composite layer, wherein the composite layer comprises:
a light guide layer and a first substrate opposite to each other, wherein the light guide layer comprises a light exit surface facing the first substrate;
a plurality of first microprisms on the light exit surface of the light guide layer, wherein each first microprism of the plurality of first microprisms extends in a first direction parallel to the light exit surface of the light guide layer, wherein the plurality of first microprisms are sequentially arranged in a second direction parallel to the light exit surface of the light guide layer, and wherein the second direction and the first direction cross each other; and
a plurality of second microprisms on a surface of the first substrate facing the light guide layer, wherein each second microprism of the plurality of second microprisms extends parallel to the second direction, and wherein the plurality of second microprisms are sequentially arranged in the first direction,
wherein the first microprisms are connected to the second microprisms, and wherein the composite layer further comprises:
a third substrate and a fourth substrate stacked and connected to each other between the plurality of first microprisms and the plurality of second microprisms,
wherein a surface of the third substrate facing the first substrate is connected to the plurality of second microprisms, and a surface of the fourth substrate facing the light guide layer is connected to the plurality of first microprisms.

\* \* \* \* \*